US007656841B2

(12) United States Patent
Brouet et al.

(10) Patent No.: US 7,656,841 B2
(45) Date of Patent: Feb. 2, 2010

(54) METHOD FOR IMPROVING ACCESS NETWORK SELECTION IN THE CONTEXT OF DISCONTINUOUS COVERAGE ACCESS NETWORKS, CORRESPONDING ACCESS CONTROLLER, AND CORRESPONDING MULTICAST ELEMENT

(75) Inventors: Jérôme Brouet, Paris (FR); Jean-Claude Faye, Gif sur Yvette (FR); Denis Rouffet, Boulogne-Billancourt (FR)

(73) Assignee: Alcatel, Paris (FR)

( * ) Notice: Subject to any disclaimer, the term of this patent is extended or adjusted under 35 U.S.C. 154(b) by 565 days.

(21) Appl. No.: 11/185,804

(22) Filed: Jul. 21, 2005

(65) Prior Publication Data
US 2006/0029022 A1    Feb. 9, 2006

(30) Foreign Application Priority Data
Aug. 3, 2004    (EP)    ................... 04291978

(51) Int. Cl.
*H04W 4/00*    (2006.01)
(52) U.S. Cl. ............... 370/331; 370/395.52; 370/395.5; 370/355; 370/396; 455/432.1; 455/446; 455/436
(58) Field of Classification Search ................. 455/436, 455/439, 446, 432.1; 711/118; 370/331, 370/395.52, 395.5, 355, 358, 396
See application file for complete search history.

(56) References Cited

U.S. PATENT DOCUMENTS

| 6,907,501 | B2 * | 6/2005 | Tariq et al. | ................... 711/118 |
| 2001/0036830 | A1 | 11/2001 | Fong et al. | |
| 2002/0072382 | A1 | 6/2002 | Fong et al. | |
| 2002/0094813 | A1 * | 7/2002 | Koshimizu et al. | .......... 455/436 |
| 2004/0005893 | A1 | 1/2004 | Igarashi et al. | |
| 2004/0203788 | A1 * | 10/2004 | Fors et al. | .................... 455/439 |
| 2005/0047372 | A1 * | 3/2005 | Yano et al. | .................. 370/331 |
| 2005/0078636 | A1 * | 4/2005 | Zhang et al. | ................. 370/331 |
| 2005/0148342 | A1 * | 7/2005 | Sylvain | ................... 455/456.3 |

\* cited by examiner

*Primary Examiner*—Charles N Appiah
*Assistant Examiner*—Kwasi Karikari
(74) *Attorney, Agent, or Firm*—Sughrue Mion, PLLC

(57) ABSTRACT

The present invention relates to a method for selecting another access network when transmitting data from a content server to a terminal in a multi access network environment comprising a discontinuous coverage radio access network.

According to the present invention, the method comprises the step of:
Upon detection of a request from a network selection controller to switch from a discontinuous coverage radio access network to another access network, sending a message to an access controller of said discontinuous coverage radio access network comprising cached data informing it to forward said cached data to said another access network.

10 Claims, 2 Drawing Sheets

METHOD FOR IMPROVING ACCESS NETWORK SELECTION IN THE CONTEXT OF DISCONTINUOUS COVERAGE ACCESS NETWORKS, CORRESPONDING ACCESS CONTROLLER, AND CORRESPONDING MULTICAST ELEMENT

BACKGROUND OF THE INVENTION

The invention is based on a priority application EP 04 291 978.7 which is hereby incorporated by reference.

The present invention relates to a method for improving access network selection in the context of discontinuous coverage access networks.

Discontinuous coverage access networks are radio access networks which do not provide a continuous radio coverage contrary to conventional second or third generation radio access networks as GSM or UMTS. Such discontinuous coverage access networks are constituted by islands of coverage supporting very high bit rates and low power cells. Such networks are commonly referred to as fourth generation access networks. They are best adapted to provide video/audio streaming services and fast download or upload of large data volumes.

The islands of radio coverage are nevertheless separated by zones of non-radio coverage so that usual hand over between cells is not to be realized by common techniques.

Moreover, if several radio access networks are co-existing in a same area, an advantageous feature is to select the best appropriate radio access network for providing a service requested by a customer while taking into account for example the capabilities of the different access networks, their availability and customer respective operator wishes.

The easiest method for such an access network selection would be to provide a central control/switch element above all possible access networks and which triggers the selection or the change of access network.

Nevertheless, in the context of discontinuous coverage access networks or in the context of co-existence of continuous and discontinuous coverage access networks such a central control/switch element should be able to cope with caching techniques mandatory in discontinuous coverage radio access networks. Indeed, caches at the different levels of the discontinuous coverage access network architecture may be filled with data during the time when the terminal is in a non coverage area. These cached data should be delivered with delay after the terminal has entered a new zone of radio coverage. If at this moment another access network is selected for the customer all cached data may be lost, if no appropriate measure is taken, rendering a simple access network selection incompatible with a seamless service.

A known solution would be that the content server retransmits these data if lost data are detected at the terminal. An appropriate retransmission protocol for example TCP would then take care for the missing data retransmission. However, such retransmissions generate a long latency delay where for example TCP is not adapted to a long latency delay and necessitate an important overhead. This is not adapted to streaming services which cannot cope with long retransmissions due to the high throughput of data to deliver. Moreover, retransmission protocols as the TCP protocols are not fitted for heterogeneous networks mixing fixed or wireless links.

A particular object of the present invention is to provide a method for providing access network selection in the context of discontinuous coverage access networks.

Another object of the invention is to provide an entity of the radio access network supporting the method.

SUMMARY OF THE INVENTION

These objects, and others that appear below, are achieved by a method for selecting another access network when transmitting data from a content server to a terminal in a multi access network environment comprising discontinuous coverage access networks according to claim 1, an access controller according to the independent claim, and a multicast element according to the independent claim.

According to the present invention, the method consists in detecting a request from a network selection controller to switch from a discontinuous coverage radio access network to another access network and then to send a message to an access controller of the discontinuous coverage radio access network comprising cached data destined to a terminal and stored in a cache memory of the access controller and forwarding these cached data to the new selected access network.

The method according to the present invention presents the advantage to provide a seamless service provision without requiring retransmission of lost cached data.

The method according to the present invention further presents the advantage to support continuous streaming services in the context of heterogeneous continuous/discontinuous coverage access networks supporting access network selection.

Further advantageous features of the invention are defined in the dependent claims.

BRIEF DESCRIPTION OF THE DRAWINGS

Other characteristics and advantages of the invention will appear on reading the following description of preferred embodiments given by way of non-limiting illustrations, and from the accompanying drawings, in which.

DETAILED DESCRIPTION OF THE INVENTION

Figure 1:
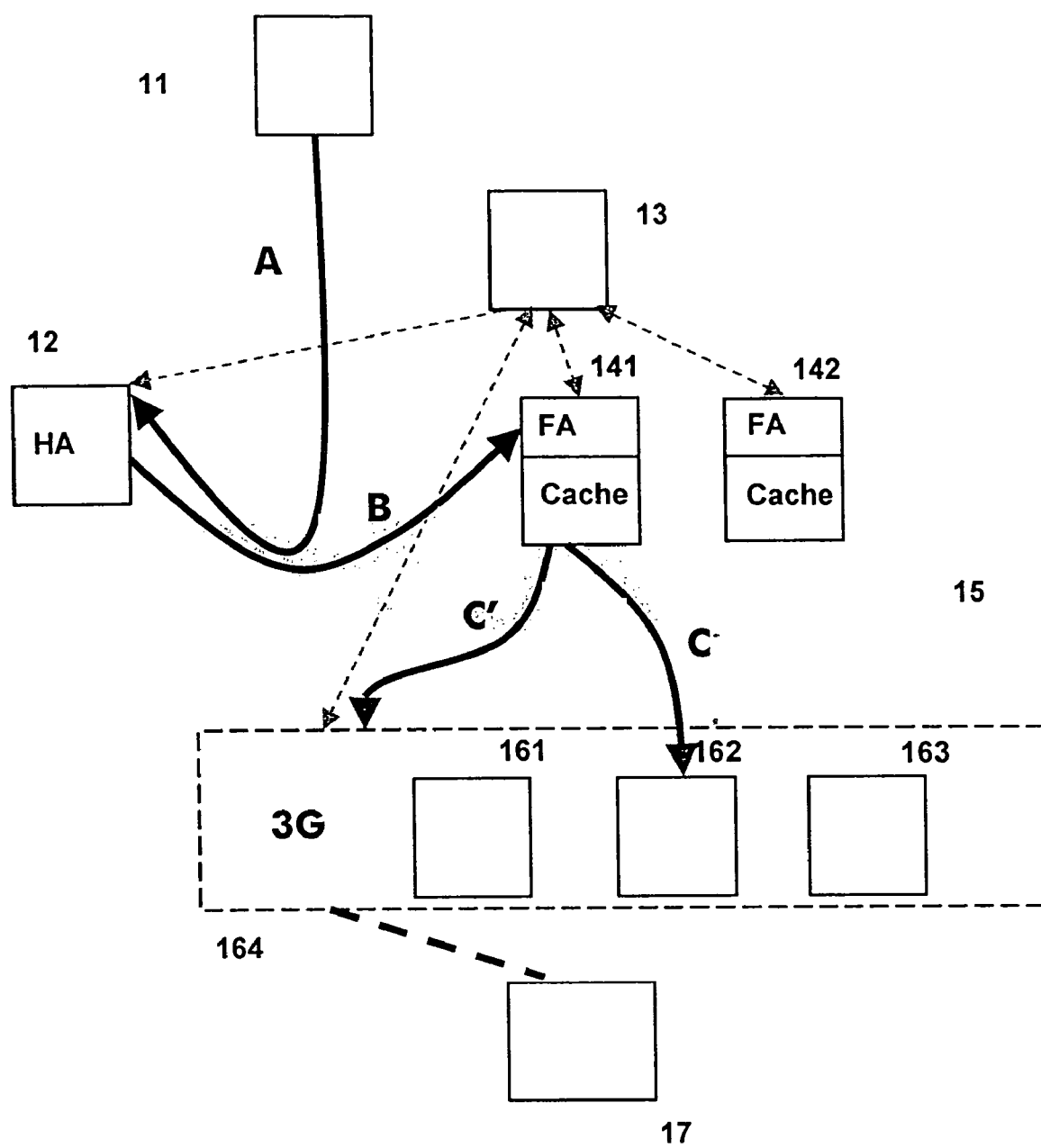
FIG. 1 shows a first implementation of the access network selection according to the present invention in the context of mixed continuous/discontinuous coverage access networks.

FIG. 1 a first implementation of the access network selection according to the present invention in the context of mixed continuous/discontinuous coverage access networks. FIG. 1 illustrates an example of network architecture for co-existing fourth generation radio access network and legacy access network where the present invention may be implemented.

The architecture of the whole system comprises a content server 11, a home agent 12 supporting mobile IP functionality, an access network selection controller 13, two possible access networks: a first discontinuous coverage radio access network comprising access controllers 141, 142, and radio access points 161, 162, 163 and a second 3G radio access network 164 providing a continuous radio coverage on the areas covered by radio access points 161, . . . , 163. Additionally, the communication network comprises an IP network 15, and a terminal 17.

Content server 11, Home agent 12, access controllers 141, 142, radio access points 161, . . . , 163 and 3G radio access network 164 are connected to IP network 15. Terminals 17 is accessible from radio access points 161, . . . , 163 and from 3G radio access network 164 through two air interfaces.

Concerning discontinuous coverage radio access network, each pair (access controller, radio access point) (141, 161), (141, 162) (142, 163) defines a zone of radio coverage. In the example described below, the radio coverage is discontinuous so that there remain areas of non radio coverage between two areas of radio coverage (141, 161), (141, 162) (142, 163). It will be understood by the person skilled in the art that the present invention may also apply to mixed continuous and discontinuous networks.

Terminal 17 is under radio coverage area (141, 162) as well as under the radio coverage of 3G radio access network. Nevertheless, it is assumed in this embodiment that terminal 17 is currently connected to content server 11 over discontinuous coverage radio access network (141, 162).

It is the task of access network selection controller 13 to detect the best appropriate radio access network for serving terminal 17 and to trigger the change of access network serving terminal 17. The criterion for changing the access network may be for example the event that terminal 17 currently served by a discontinuous coverage radio access network has its terminal cache memory not filled enough, so that it is advantageous to change the access network to a legacy 3G radio access network providing continuous coverage. Other criteria for change of access network may be dependent on user preferences, operator preferences, required service types . . . . Such criteria are clear for a person skilled in the art and are out of the scope of the present invention.

Access network selection controller 13 may communicate with 3G access network 164, to access controllers 141, 142 of discontinuous coverage radio access network as well as to Home agent 12 in order to inform these entity of a need for changing the access network for serving terminal 17.

Access controllers 141, 142 comprise a first portion each containing a foreign agent which is addressed by the home agent in the context of mobile IP. Indeed, when sending data content server 11 uses a unique IP address to identify terminal 17.

Additionally, access controllers 141, 142 contain a cache memory for storing received data which cannot be immediately delivered to terminal 17 because terminal 17 is currently moving in a non-radio coverage zone or because these data where sent in an anticipated way to access controllers 141, 142.

The data not immediately used have to be stored in an appropriate cache memory which should be large enough to ensure that the whole data received during the period where terminal 17 is not under any radio coverage are available in the cache memory. The cache memory should be dimensioned using for example parameters as the average data throughput on the link between access controller 141, 142 and radio access points 161, . . . , 163 or the average duration of the non coverage period for terminal 17.

Then, the data stored in the cache memory are forwarded to the radio access point 162 under the coverage of which terminal 17 is currently located (arrow C on FIG. 1).

In case, now, of a message from the access network selection controller 13 indicating that terminal 17 should no more be server by discontinuous coverage radio access network (141, 162) but by 3G radio access network 164. The data sent from content server 11 follow following path according to the present invention:

Content server 11—Home agent 12 (arrow A on FIG. 1), then

Home agent 12—Foreign agent of access controller 141 (arrow B on FIG. 1), and then Cache memory of access controller 141—3G radio access network 164 (arrow C' on FIG. 1).

This mechanism enables it to first send over arrow C' the cached data received from content server 11 at access controller 141 but which where not forwarded immediately to terminal 17 and then to forward the new data received from content server 11 after the change of access network. Since the cached data as well as the new data are transitiing through the cache memory of access controller 141, a continuous data flow is ensured at terminal 17.

It will be understood by those skilled in the art that the 3G radio access network used to illustrate the present invention in FIG. 1 can be any other type of access network either fixed or wireless.

Figure 2:
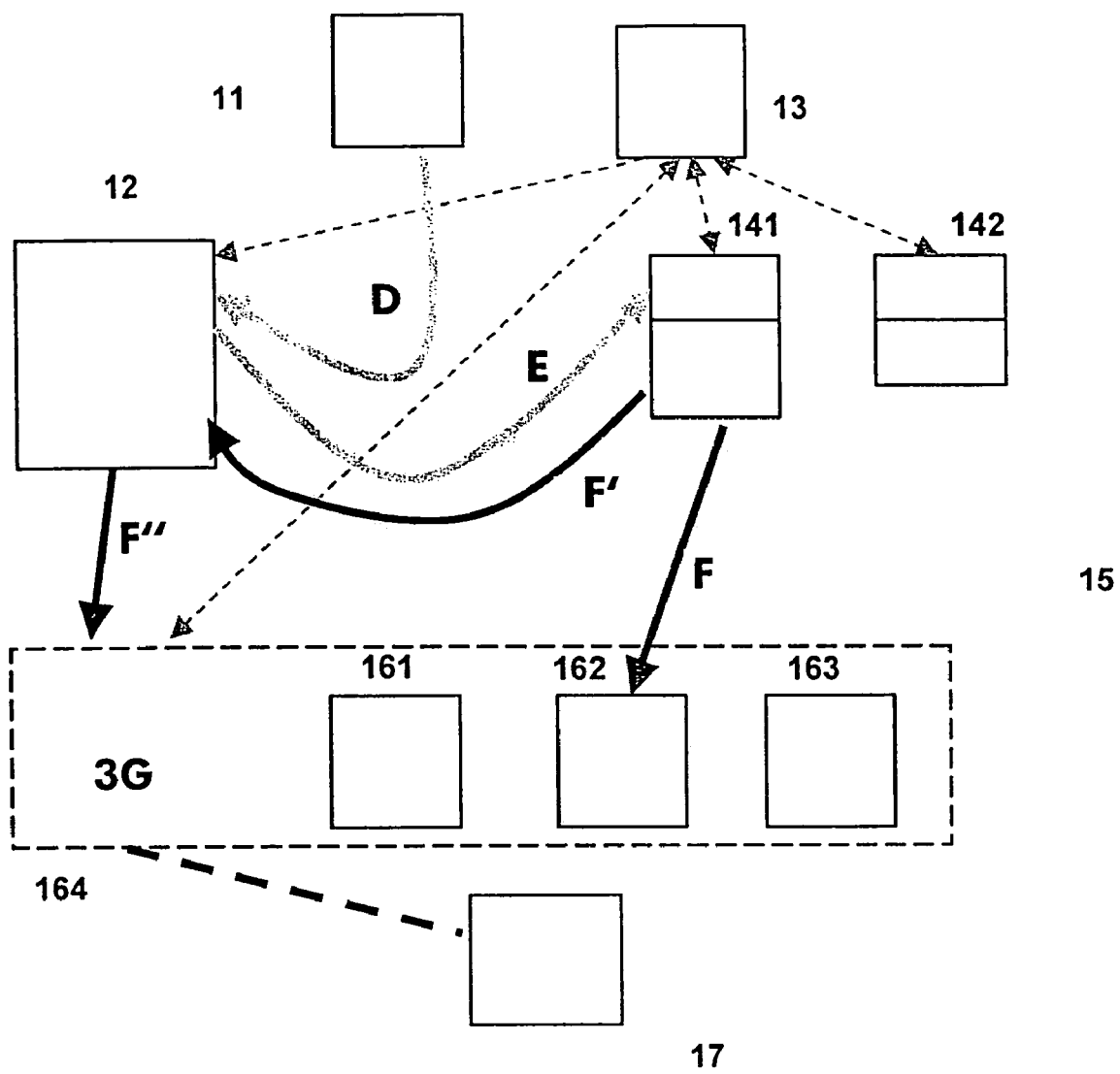
FIG. 2 shows a second implementation of the access network selection according to the present invention in the context of mixed continuous/discontinuous coverage access networks.

FIG. 2 (?) shows a second implementation of the access network selection according to the present invention in the context of mixed continuous/discontinuous coverage access networks.

The architecture of the whole system comprises a content server 11, a multicast element 12 (instead of a Home agent 12 of FIG. 1), and an access network selection controller 13, two possible access networks: a first discontinuous coverage radio access network comprising access controllers 141, 142, and radio access points 161, 162, 163 and a second 3G radio access network 164 providing a continuous radio coverage on the areas covered by radio access points 161, . . . , 163. Additionally the communication network comprises an IP network 15, and terminal 17.

Content server 11, multicast element 12, access controllers 141, 142, radio access points 161, . . . , 163 and 3G radio access network 164 are connected to IP network 15. Terminals 17 is accessible from radio access points 161, . . . , 163 and from 3G radio access network 164 through two air interfaces.

Terminal 17 is under radio coverage area (141, 162) as well as under the radio coverage of 3G radio access network. Nevertheless, it is assumed in this embodiment that terminal 17 is currently connected to content server 11 over discontinuous coverage radio access network (141, 162).

It is the task of access network selection controller 13 to detect the best appropriate radio access network for serving terminal 17 and to trigger the change of access network serving terminal 17. The criterion for changing the access network may be for example the event that terminal 17 currently served by a discontinuous coverage radio access network has its terminal cache memory not filled enough, so that it is advantageous to change the access network to a legacy 3G radio access network providing continuous coverage.

Access network selection controller 13 can communicate with 3G access network 164, to access controllers 141, 142 of discontinuous coverage radio access network as well as to multicast element 12.

Multicast element 12 is a central element in the communication network which controls the transmission of data from content server 11 to terminal 17. Multicast element 12 is also involved in the proper execution of access network modification.

Access controllers 141, 142 comprise a first portion containing control functions which may be addressed by multicast element 12 or by access network selection controller 13. Additionally, access controllers 141, 142 contain a cache memory for storing received data which cannot be immediately delivered to terminal 17.

Then, the data stored in the cache memory are forwarded to radio access point 162 under the coverage of which terminal 17 is currently located (arrow F on FIG. 2).

In case now of a message from the access network selection controller 13 indicating that terminal 17 should no more be served by discontinuous coverage radio access network but by 3G radio access network, and according to the present invention, the following steps will be executed:

Multicast element 12 first asks serving access controller 141 for data stored in its cache memory (arrow E in FIG. 2) in order that no data already sent by content server 11 but not already received by terminal 17 are not lost. These data are sent back to multicast element 12 (arrow F' of FIG. 2). Then, multicast element 12 sends these data to 3G access network 164.

An advantage of the present embodiment compared to the first embodiment illustrated in FIG. 1 is that access controllers 141, 142 of the discontinuous coverage radio access network have a reduced complexity since they need not to remain the anchor point for data transmission during the whole time spent by terminal 17 under the control of 3G radio access network 164. On the contrary, in the present embodiment it is the task of multicast element 12 to ask for cached data stored in access controller 141, 142 and to take care for transmitting these cache data before the data received after the access network change has happened.

It will be clear for a person skilled in the art that the change of access network from a 3G access network to a discontinuous coverage access network can also be performed using the method according to the present invention.

The invention claimed is:

1. A method for selecting an access network when transmitting data from a content server to a terminal supporting mobile IP functionality, said terminal being in an environment comprising a discontinuous coverage radio access network and a second access network, said terminal being currently served by said discontinuous coverage radio access network, said method comprising the step of:
   if a request from an access network selection controller to switch from said discontinuous coverage radio access network to said second access network is detected, sending a message to an access controller of said discontinuous coverage radio access network comprising cached data destined to said terminal, said message informing said access controller to forward said cached data to said second access network, wherein
   said second access network provides continuous radio coverage on all areas covered by said discontinuous coverage radio access network.

2. The method according to claim 1, wherein said mobile IP functionality is provided between said content server and said terminal by said access controllers of said discontinuous coverage radio access network, said method further comprising the steps of:
   sending from said access network selection controller said request for switching to said second access network to an access controller currently serving said terminal; and
   sending from said serving access controller said cached data to said second access network.

3. The method according to claim 1, wherein said cached data are forwarded from said access controller to a multicast element forwarding said cached data to said second access network.

4. The method according to claim 1, further comprising the step of said second access network sending said received cached data to said terminal and sending new data received from said content server to said terminal after the change of the access network.

5. The method according to claim 3, wherein said second access network may be a fixed or a wireless access network.

6. The method according to claim 1, wherein the services provided by said content server to said terminal are streaming services.

7. The method according to claim 1, wherein the services provided by said content server to said terminal are non real time services.

8. An access controller belonging to a discontinuous coverage radio access network which provides services from a content server to a terminal, said access controller being associated to a plurality of radio access points able to communicate with said terminal over a radio link, said access controller comprising:
   a cache memory for storing data sent by said content server;
   a means for receiving an access network modification request from an access network selection controller controlling a plurality of access networks in a predefined area, said request being dedicated to trigger the change of access network from said discontinuous coverage radio access network to said a second access network;
   a means for forwarding said cached data to said second access network upon detection of said access network modification request, wherein
   said second access network provides continuous radio coverage on the areas covered by said discontinuous coverage radio access network.

9. A multicast element belonging to a discontinuous coverage radio access network which provides services from a content server to a terminal, said multicast element being a central entity of said discontinuous coverage access network controlling a plurality of access controllers, said multicast element comprising:
   a means for receiving data from said content server;
   a means for forwarding said received data to a cache memory of an access controller of said discontinuous coverage radio access network;
   a means for receiving an access network modification request from a network selection controller controlling a plurality of access networks in a predefined area, said request being dedicated to trigger the change of access network from said discontinuous coverage radio access network to a second access network;
   a means for receiving cached data from the cache memory of said access controller upon reception of said access network modification request; and
   a means for forwarding said cached data to said second access network, wherein
   said second access network provides continuous radio coverage on all areas covered by said discontinuous coverage radio access network.

10. A terminal supporting mobile IP functionality, said terminal being in an environment comprising a discontinuous coverage radio access network and a second access network, said terminal being currently served by said discontinuous coverage radio access network, said terminal comprising:
   a switching means for switching to said second network if a request from an access network selection controller to switch from said discontinuous coverage radio access network to said second access network is detected,
   wherein said access network selection controller sends a message to an access controller of said discontinuous coverage radio access network comprising cached data destined to said terminal, said message informing said access controller to forward said cached data to said second access network, and
   wherein said second access network provides continuous radio coverage on all areas covered by said discontinuous coverage radio access network.

* * * * *